July 29, 1941.  Y. H. KURKJIAN  2,250,639

ANIMAL TRAP

Filed April 18, 1940

Inventor
YERVANT H. KURKJIAN

By Irving A. McCathran
Attorney

Patented July 29, 1941

2,250,639

UNITED STATES PATENT OFFICE 2,250,639

ANIMAL TRAP

Yervant H. Kurkjian, Hawthorne, N. J.

Application April 18, 1940, Serial No. 330,395

5 Claims. (Cl. 43—83.5)

This invention relates to animal traps and has for one of its objects the production of a simple and efficient bait-set trap which may be easily set and which will not be likely to spring and thereby injure the fingers of the operator while the operator is in the process of setting the trap.

A further object of this invention is the production of a simple and efficient trap having a jaw-securing member which conforms to the contour of the thumb and which contacts the trigger to automatically move the trigger to a bait-engaging position and thereby facilitate the placing of the bait under the trigger.

Other objects and advantages of the present invention will appear throughout the following specification and claims.

Figure 1:
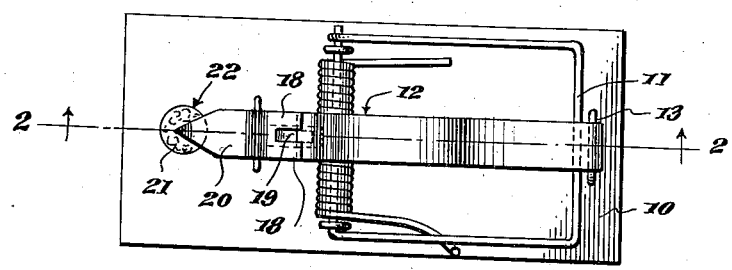
Figure 1 is a top plan view of the trap.

By referring to the drawing, it will be seen that 10 designates the base upon which is pivotally mounted a spring-looped animal-engaging jaw 11 of the conventional type. A jaw-securing member 12 is hingedly secured to one end to the base by means of an anchoring staple 13. This jaw-securing member 12 is inwardly bowed longitudinally so as to conform to the contour of the under face of the thumb of an operator to facilitate the holding of the jaw-securing member in the manner shown in Figure 2, while setting the trap.

Figure 2:
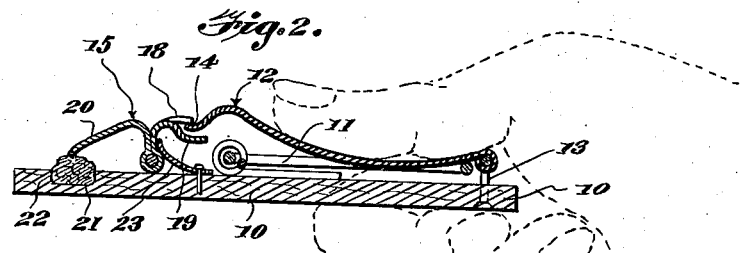
Figure 2 is a longitudinal sectional view taken on line 2—2 of Figure 1.
Figure 3:
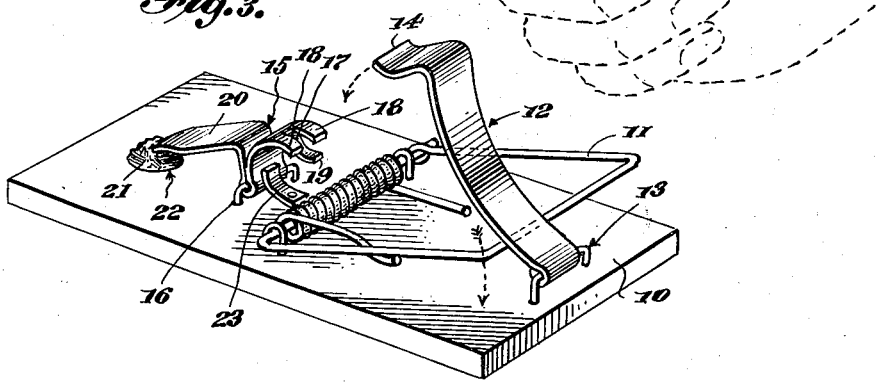
Figure 3 is a perspective view of the trap showing the trigger and jaw-securing member in a released position.

The jaw-securing member 12 is provided with a downwardly and forwardly extending trigger-engaging lip 14 at its forward end, which is adapted to engage the trigger 15 for holding the member 12 in a set position. The trigger 15 is hingedly secured to the base 10 by means of a staple 16, forwardly of the member 12, and the trigger 15 is provided with a rearwardly extending portion 17 having a pair of parallel overhanging tongues 18 and an underset tongue 19. The underset tongue 19 is of greater length than the tongues 18 and is arranged on a lower plane than the tongues 18, as shown in Figures 2 and 3. The trigger 15 is also provided with a forwardly and downwardly extending bait-engaging hook or point 20 which is adapted to engage the bait 21 and firmly hold the bait 21 against accidental displacement from the bait-receiving socket 22. A flat spring 23 is carried by the base 10 and engages the trigger 15 in the manner shown in Figures 2 and 3 to normally hold the trigger 15 in a position for automatic locking engagement with the tongues 18 and 19.

The operation of the device is as follows:

The animal-engaging jaw 11 is swung to the position shown in Figures 1, 2 and 3, and the jaw-securing member 12 is moved to the position shown in Figure 2 and Figure 3, whereby the jaw-securing member 12 will overlie the animal-engaging jaw 11. This jaw-securing member 12 is grasped in the manner shown in Figure 2 whereby the underface of the thumb will lie within the longitudinal concave upper face of the jaw-securing member 12 and the forefinger will lie under the base 10, as shown in detail in Figure 2. The forwardly extending lip 14 will contact the underlying tongue 19 and swing the trigger 15 to a position whereby the overhanging tongues 18 will overlie the lip 14. The bait 21 is then placed in the socket 22 in a manner so as to contact the hook 20 and support the trigger 15 in the position shown in Figure 2, thereby locking the jaw-securing member 12 in a set position. The flat spring 23 is only of sufficient tension to normally swing the trigger 15 away from the lip 14 of the jaw-securing member when the two parts are disengaged. This will at all times hold the overhanging tongues 18 in a position to be cleared by the lip 14 when the jaw-securing member 12 is swung to a trigger-engaging position at which time the lip 14 will contact the underset tongue 19 and swing the trigger 15 toward the lip 14 and cause the overhanging tongues 18 to overlie the lip 14 in the position shown in Figure 2. The purpose of this spring is to prevent the trigger from falling back toward the jaw-securing member 12 while setting the trap and holding the same in a vertically edgewise position.

As the rodent eats the bait 21 the trigger 15 will swing into the socket 22 and move the tongues 18 out of contact with the lip 14 releasing the trigger 15 from the member 12 and the tension of the animal-engaging jaw 11 will cause this jaw to swing to an animal-engaging position.

The present trap is especially adaptable for catching rodents, small animals, mice, and the like, and may be easily set and because of the fact that the trap is a bait-set trap, the trap is not likely to accidentally spring and injure the fingers of the operator while the trap is being set or placed in position for catching a rodent.

It should be understood that certain detail changes in the mechanical construction and arrangement of parts may be employed without departing from the spirit of the invention, so long as such changes fall within the scope of the appended claims.

Having described the invention, what is claimed as new is:

1. A bait-set trap of the character described comprising a base, an animal-engaging jaw hinged upon the base, tension means for said jaw, a trigger hinged upon the base, a jaw securing member hinged upon said base and adapted to overhang the animal-engaging jaw and also adapted to engage said trigger for holding the animal-engaging jaw in a set position in engagement with said jaw-securing member, the trigger having a bait-engaging portion adapted to engage a bait in a manner whereby the trigger will be held in a set position by the bait and in locking engagement with said jaw-securing member, and said jaw-securing member being bowed inwardly toward said base and conforming to the contour of the under face of an operator's thumb to facilitate the holding of the jaw-securing member in a locking position with respect to said trigger while the trap is being set.

2. A bait-set trap of the character described comprising a base, an animal-engaging jaw hinged upon the base, tension means for said jaw, a trigger hinged upon the base, a jaw securing member hinged upon said base and adapted to overhang the jaw and hold the same in a set position in engagement with said trigger, the trigger having a bait-engaging portion adapted to engage a bait in a manner whereby the trigger will be held in a set position by the bait and in locking engagement with said jaw-securing member, said jaw-securing member being adapted to hold the jaw in a set position, said jaw-securing member having a forwardly extending lip, said trigger having an overhanging means adapted to engage the lip to hold the jaw-securing member in a set position, and said trigger also having an underlying means adapted to be engaged by said lip for moving said overhanging means in contact with the lip.

3. A bait-set trap of the character described comprising a base, an animal-engaging jaw hinged upon the base, tension means for said jaw, a trigger hinged upon the base, a jaw securing member hinged upon said base and adapted to overhang the jaw and hold the same in a set position in engagement with said trigger, the trigger having a bait-engaging portion adapted to engage a bait in a manner whereby the trigger will be held in a set position by the bait and in locking engagement with said jaw-securing member, said jaw-securing member being adapted to hold the jaw in a set position, said jaw-securing member having a forwardly extending lip, said trigger having an overhanging means adapted to engage the lip to hold the jaw-securing member in a set position, said trigger also having an underlying means adapted to be engaged by said lip for moving said overhanging means in contact with the lip, and means for automatically holding the trigger out of contacting engagement with the jaw-securing member when the trigger is in a released position.

4. A bait-set trap of the character described comprising a base, an animal-engaging jaw hinged upon the base, tension means for said jaw, a trigger hinged upon the base, a jaw-securing member hinged upon said base and adapted to overhang the jaw and hold the jaw in a set position in engagement with said trigger, the trigger having a bait-engaging portion adapted to engage a bait in a manner whereby the trigger will be held in a set position by the bait and in locking engagement with said jaw-securing member, said jaw-securing member being adapted to hold the jaw in a set position, said jaw-securing member having a forwardly extending lip, said trigger having overhanging tongues adapted to engage the lip to hold the jaw-securing member in a set position, and said trigger having an underlying tongue adapted to be engaged by said lip for moving said overhanging tongues in contact with the lip.

5. A bait-set trap of the character described comprising a base, an animal-engaging jaw hingedly supported upon the base, tension means for the jaw, a jaw-securing member adapted to overhang the animal-engaging jaw, a trigger hingedly secured to the base and adapted to engage the jaw-securing member to hold the jaw-securing member in a set position, and said trigger having bait-engaging means adapted to overhang a bait and to swing away from the jaw-securing member to release the trigger from the jaw-securing member in a manner whereby the trigger will be supported in a locking position when engaging a bait and will release the jaw-securing member when the bait is eaten by an animal or removed from under the trigger.

YERVANT H. KURKJIAN.